(12) United States Patent
Kanda et al.

(10) Patent No.: US 6,918,646 B2
(45) Date of Patent: Jul. 19, 2005

(54) PRINTING APPARATUS AND METHOD

(75) Inventors: Hidehiko Kanda, Kanagawa (JP); Jiro Moriyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 83 days.

(21) Appl. No.: 10/413,373

(22) Filed: Apr. 15, 2003

(65) Prior Publication Data

US 2004/0004645 A1 Jan. 8, 2004

(30) Foreign Application Priority Data

Apr. 15, 2002 (JP) ........................................ 2002/112616

(51) Int. Cl.$^7$ .......................................... B41J 29/393
(52) U.S. Cl. ............................ 347/19; 347/41; 347/112
(58) Field of Search ........................... 347/19, 41, 112; 358/1, 16, 1.2, 1.7; 710/53

(56) References Cited

U.S. PATENT DOCUMENTS

| | | | | |
|---|---|---|---|---|
| 5,382,968 A | * | 1/1995 | Endoh ......................... | 347/112 |
| 5,671,445 A | * | 9/1997 | Gluyas et al. ................. | 710/53 |
| 5,816,714 A | | 10/1998 | Hori ........................... | 400/61 |
| 6,097,499 A | | 8/2000 | Casey et al. ................ | 358/1.16 |
| 6,142,604 A | | 11/2000 | Kanda et al. ................. | 347/41 |
| 6,313,922 B1 | * | 11/2001 | Jackson ...................... | 358/1.16 |
| 2002/0063750 A1 | | 5/2002 | Kanda et al. ................. | 347/41 |
| 2002/0070997 A1 | | 6/2002 | Nakagawa et al. ........... | 347/37 |
| 2002/0075340 A1 | | 6/2002 | Moriyama .................... | 347/14 |

FOREIGN PATENT DOCUMENTS

| | | |
|---|---|---|
| EP | 0 887 763 A2 | 12/1996 |
| EP | 0 782 095 | 7/1997 |
| EP | 0 917 093 A2 | 11/1998 |
| JP | 58-146929 | 9/1983 |
| JP | 64-21528 | 1/1989 |
| JP | 11-259248 | 9/1999 |
| JP | 2000127522 | 5/2000 |
| WO | 97/08622 | 3/1997 |

* cited by examiner

*Primary Examiner*—Hai Pham
*Assistant Examiner*—Lam Nguyen
(74) *Attorney, Agent, or Firm*—Fitzpatrick, Cella, Harper & Scinto

(57) ABSTRACT

In a printing apparatus using a printhead having an array of printing elements in which a plurality of printing elements are arranged in a predetermined direction, the printing apparatus performing printing by scanning the printhead over a printing medium in a direction crossing to the predetermined direction on the basis of information transmitted from a host apparatus, print data transmitted from the host apparatus is stored in a buffer, printing by the scanning is started when the print data stored in the buffer reaches a first amount that is smaller than an amount of print data to be printed on the printing medium by the printhead by one scanning, the scanning is interrupted when storage of the print data in the buffer is delayed during the scanning, and when, after the interruption, subsequent print data stored in the buffer reaches a second amount, the interrupted scanning is executed to complete printing by one scanning. Accordingly, with an inexpensive arrangement having a memory whose capacity is smaller than the data amount to be printed by one main scanning, interruption of printing/scanning can be suppressed, and even when printing/scanning is interrupted halfway, high-quality printing can be performed.

25 Claims, 7 Drawing Sheets

PRINTING APPARATUS AND METHOD

FIELD OF THE INVENTION

The present invention relates to a printing apparatus and method and, more particularly, to a printing apparatus for performing printing by scanning a printhead having an array of printing elements arranged in a predetermined direction over a printing medium in a direction crossing to the predetermined direction on the basis of information transmitted from a host apparatus. More specifically, the present invention relates to a printing apparatus and method which allow high-speed, high-quality printing while reducing the cost of the printing apparatus by decreasing the capacity of a storage means (memory) arranged in the printing apparatus.

BACKGROUND OF THE INVENTION

At present, there are known various printing methods used to print characters, images, information, and the like on printing media. An inkjet printing method has widely been used in printing apparatuses, copying machines, and the like because of low noise, low apparatus cost, low running cost, and compact apparatus can be facilitated.

A conventional serial inkjet printing apparatus prints one page by alternately repeating main scanning by a printhead and sub-scanning of conveying a printing medium. A memory having a memory capacity enough to store all data to be printed by one main scanning at a main scanning printing width printable by a printing apparatus is used as a print buffer for storing data to be printed by the printhead. After all data to be printed by one main scanning are stored in the print buffer, main scanning of the printhead starts to perform printing.

Recently, in order to achieve color printing, higher image quality, higher resolution, and higher-speed printing, the number of printheads and the number of printing elements (ink discharge elements) arranged in each printhead tend to increase.

A larger number of printheads and a larger number of printing elements arranged in each printhead increase the data amount printed by one main scanning. The memory capacity necessary for the print buffer increases, resulting in a high apparatus cost.

To prevent this, Japanese Patent Laid-Open No. 58-146929 discloses a technique of managing an address at which print data is stored, efficiently using a memory, and performing printing with a memory capacity smaller than a data amount printed by one main scanning.

This reference, however, does not disclose processing of null data as data representing no printing. The use of the memory is not optimally efficient. Also, this reference does not disclose printing operation when data transfer to the memory does not catch up with printing operation.

Japanese Patent Laid-Open No. 11-259248, which corresponding to U.S. Pat. No. 6,097,499 discloses a technique of starting main scanning before the completion of receiving data of one main scanning.

The technique disclosed in this reference assumes that print data is received before actual printing by main scanning. A host apparatus such as a computer which transfers print data to a printing apparatus must continuously execute printing without any interrupt or interference of data transfer.

Windows System® which is widely used as the OS of recent computers is a general-purpose multitask system. In practice, the computer hardly performs only data transfer during printing. The program of a printer driver installed in a computer allows continuously executing printing without any interrupt or interference of data transfer. In this case, the merit of the multitask system is lost. This reference does not disclose processing of null data as data representing no printing. The use of the memory is not optimally efficient.

These problems are not unique to an inkjet printing apparatus but common to all serial printing apparatuses.

SUMMARY OF THE INVENTION

It is an object of the present invention to provide a printing apparatus which is designed to start printing before print data transmitted from a host reaches an amount corresponding to one main scanning of a printhead to improve the throughput and, accordingly, enable high-quality printing even when data transfer from the host apparatus is delayed.

It is another object of the present invention to provide a printing apparatus which can improve the throughput by employing an inexpensive arrangement having a memory with a capacity smaller than the data amount to be printed by one main scanning and also enable high-quality printing even when printing operation is interrupted during scanning because of a delay in data transfer from the host apparatus.

It is still another object of the present invention to provide a printing method which is designed to start printing before print data transmitted from a host reaches an amount corresponding to one main scanning of a printhead to improve the throughput and, accordingly, enable high-quality printing even when data transfer from the host apparatus is delayed.

It is still another object of the present invention to provide a printing method which can improve the throughput by employing an inexpensive arrangement having a memory with a capacity smaller than the data amount to be printed by one main scanning and also enable high-quality printing even when printing operation is interrupted during scanning because of a delay in data transfer from the host apparatus.

In order to achieve the above objects, according to an aspect of the present invention, there is provided a printing apparatus for performing printing by scanning a printhead having an array of printing elements arranged in a predetermined direction over a printing medium in a direction crossing to the predetermined direction on the basis of information transmitted from a host apparatus, comprising, a buffer which stores print data transmitted from the host apparatus, start control means for starting printing by the scanning when the print data stored in the buffer reaches a first amount that is smaller than an amount of print data to be printed on the printing medium by the printhead by one scanning, scanning interrupt means for interrupting the scanning when storage of the print data in the buffer is delayed during the scanning, and complementary printing means for executing the interrupted scanning to complete printing by one scanning when, after the interruption, subsequent print data stored in the buffer reaches a second amount.

In the present invention, in a printing apparatus for performing printing by scanning a printhead having an array of printing elements arranged in a predetermined direction over a printing medium in a direction crossing to the predetermined direction on the basis of information transmitted from a host apparatus, print data transmitted from the host apparatus is stored in a buffer, printing by the scanning is started when the print data stored in the buffer reaches a first amount that is smaller than an amount of print data to be printed on the printing medium by the printhead by one scanning, the scanning is interrupted when storage of the print data in the buffer is delayed during the scanning, and when, after the interruption, subsequent print data stored in the buffer reaches a second amount, the interrupted scanning is executed to complete printing by one scanning.

In this construction, printing/scanning is started when print data in the first amount smaller than the print data amount to be printed on the printing medium by the printhead by one scanning is stored in the buffer which stores print data. If storage of the print data in the buffer is delayed during the scanning, the printing/scanning is interrupted. When subsequent print data in the second amount is stored in the buffer, the interrupted scanning is executed to complete printing by one scanning.

Hence, when the first and second amounts are appropriately set, with an inexpensive arrangement having a memory whose capacity is smaller than the data amount to be printed by one main scanning, interruption of printing/scanning can be suppressed, and even when printing/scanning is interrupted halfway, high-quality printing can be performed.

The buffer may have a capacity smaller than a print data amount to be printed by scanning the printhead once with respect to a maximum width that can be printed by scanning the printhead in the apparatus.

In this case, the first amount equals the capacity of the print buffer and preferably, the print buffer stores newly transmitted print data by circularly re-using a portion where print data already used for printing is stored.

Preferably, a sum of the first amount and the second amount equals the amount of print data to be printed on the printing medium by the printhead by one scanning.

More preferably, the apparatus further comprises setting change means for, when the interrupt occurs, changing the first amount for next scanning.

In this case, when the interrupt occurs, the setting change means may decrease the first amount by a predetermined amount.

Further, when the interrupt occurs in consecutive scanning operations, the setting change means may set the first amount to different values for the respective scanning operations.

When the interrupt does not occur, the setting change means may return the first amount to an initial value.

Preferably, the apparatus further comprises condition change means for changing the first amount in accordance with at least one of a size of printing medium, print resolution, data amount per pixel, type and number of print agents to be used for printing, and number of printing elements to be used for one scanning.

The apparatus preferably execute multipass printing in which printing is completed by scanning each region a plurality of number of times.

In this case, the apparatus may further comprise multi-setting change means for, when the interrupt occurs, setting the first amount to different values for the plurality of number of times of subsequent scanning.

The printing may be performed by performing the scanning in two directions.

In this case, the start control means may set the first amount independently for each scanning direction.

The apparatus may further comprise standby means for moving the printhead to a start position of the scanning after the scanning interrupt means interrupts the scanning.

In this case, the standby means may move the printhead to the start position of the scanning, or the standby means moves the printhead to a predischargeable position, and the complementary printing means execute predischarge before execution of the interrupted scanning.

The buffer may be divided into a plurality of blocks, and each of the first amount and the second amount is a multiple of a capacity of a block.

Preferably, the printhead is an inkjet printhead which performs printing by discharging ink.

More preferably, the printhead is a printhead which discharges ink using a thermal energy and has a thermal energy transducer which generates the thermal energy to be applied to the ink.

The above objects are also achieved by a printing method which causes a printhead having an array of printing elements arranged in a predetermined direction to scan over a printing medium in a direction crossing to the predetermined direction on the basis of information transmitted from a host apparatus, comprising, a storage step of storing, in a buffer, print data transmitted from the host apparatus, a start control step of starting printing by the scanning when the print data stored in the buffer reaches a first amount that is smaller than an amount of print data to be printed on the printing medium by the printhead by one scanning, a scanning interrupt step of interrupting the scanning when storage of the print data in the buffer is delayed during the scanning, and a complementary printing step of executing the interrupted scanning to complete printing by one scanning when, after the interruption, subsequent print data stored in the buffer reaches a second amount.

Furthermore, those and other objects are achieved by a computer program which causes a computer to execute the method, or a storage medium which stores the computer program.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

In this specification, "print" is not only to form significant information such as characters and graphics, but also to form, e.g., images, figures, and patterns on printing media in a broad sense, regardless of whether the information formed is significant or insignificant or whether the information formed is visualized so that a human can visually perceive it, or to process printing media.

"Printing media" are any media capable of receiving ink, such as cloth, plastic films, metal plates, glass, ceramics, wood, and leather, as well as paper sheets used in common printing apparatuses.

Furthermore, "ink" (to be also referred to as a "liquid" hereinafter) should be broadly interpreted like the definition of "print" described above. That is, ink is a liquid which is applied onto a printing medium and thereby can be used to form images, figures, and patterns, to process the printing medium, or to process ink (e.g., to solidify or insolubilize a colorant in ink applied to a printing medium).

(First Embodiment)

Figure 1:
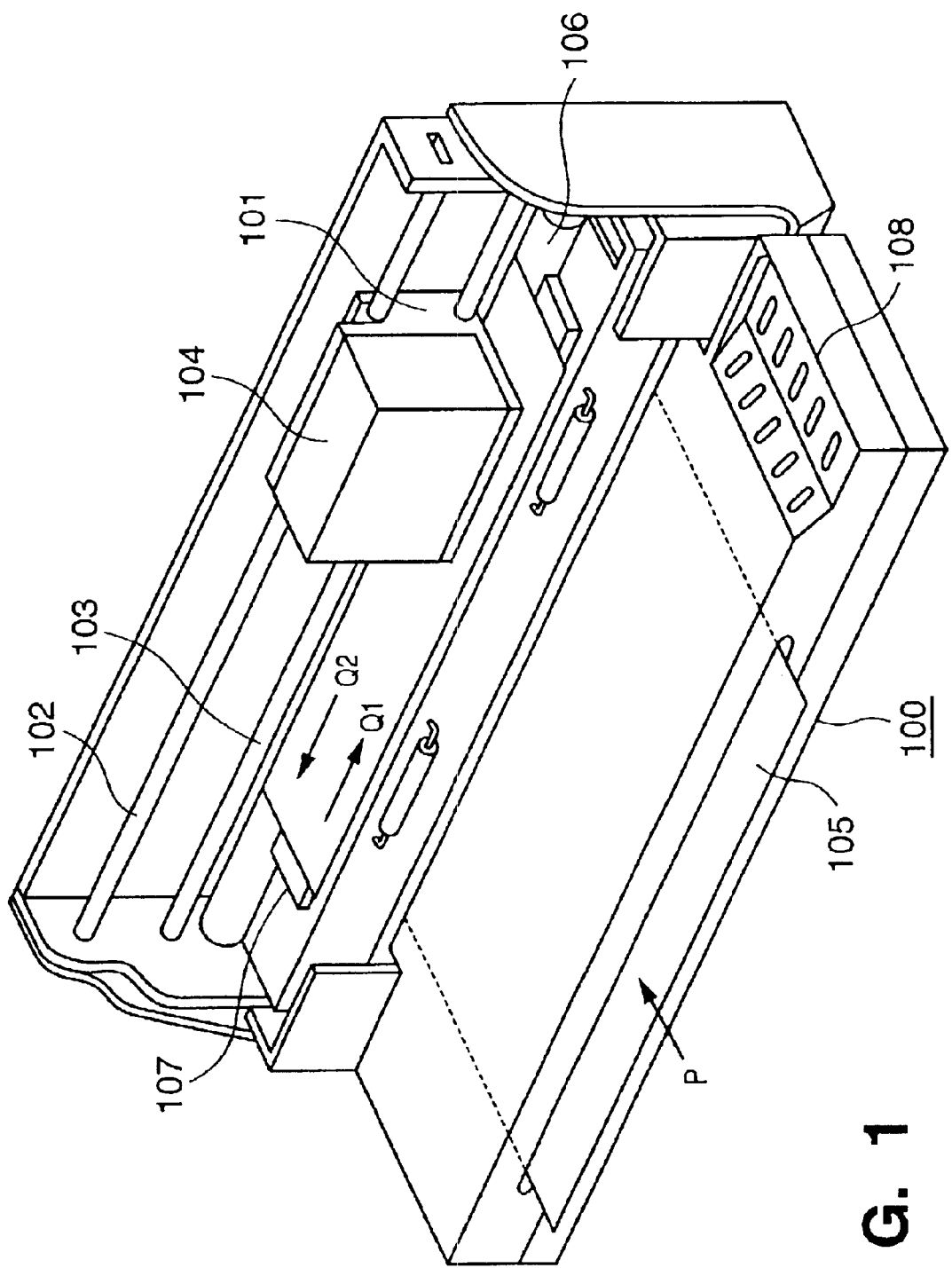
FIG. 1 is a perspective view showing the schematic arrangement of an inkjet printing apparatus according to the first embodiment of the present invention.

FIG. 1 is a schematic perspective view of an ink jet printing apparatus in a printing system representing a first embodiment of the present invention.

A printing medium 105 inserted into the sheet feed position of a printing apparatus 100 is fed by a feed roller 106 in a direction indicated by an arrow P, and conveyed to the printable region of a printhead 104. A platen 107 is arranged below the printing medium 105 in the printable region. A carriage 101 can be moved by two guide shafts 102 and 103 along them. The carriage 101 is reciprocally scanned by driving of a stepping motor (not shown) within a scanning region including a printing region in directions indicated by arrows Q1 and Q2 serving as a main scanning direction. After one main scanning ends, the printing medium is fed by a predetermined amount in the sub-scanning direction indicated by the arrow P, and waits for the next main scanning. Main scanning and sub-scanning are repeated to perform printing operation of one page. As for a printing width in the main scanning direction, a region where the printhead can be mechanically scanned is determined by the apparatus design. The maximum printing width is determined depending on the apparatus in correspondence with the scanning region. Printing can be done for a printing medium having a printing width determined by the scanning region of the printhead or a printing medium having a smaller printing width in the printing apparatus.

In FIG. 1, the printhead 104 mounted on the carriage 101 includes orifices (ejection openings) capable of discharging ink, and an ink tank which contains ink. The printhead is mounted on the carriage such that printing is done by discharging ink from the openings of the printhead to the printing medium below it. Reference numeral 108 denotes switches and a display unit. The switches are used to power on/off the printing apparatus or set various printing modes. The display can display various statuses of the printing apparatus.

Figure 2:
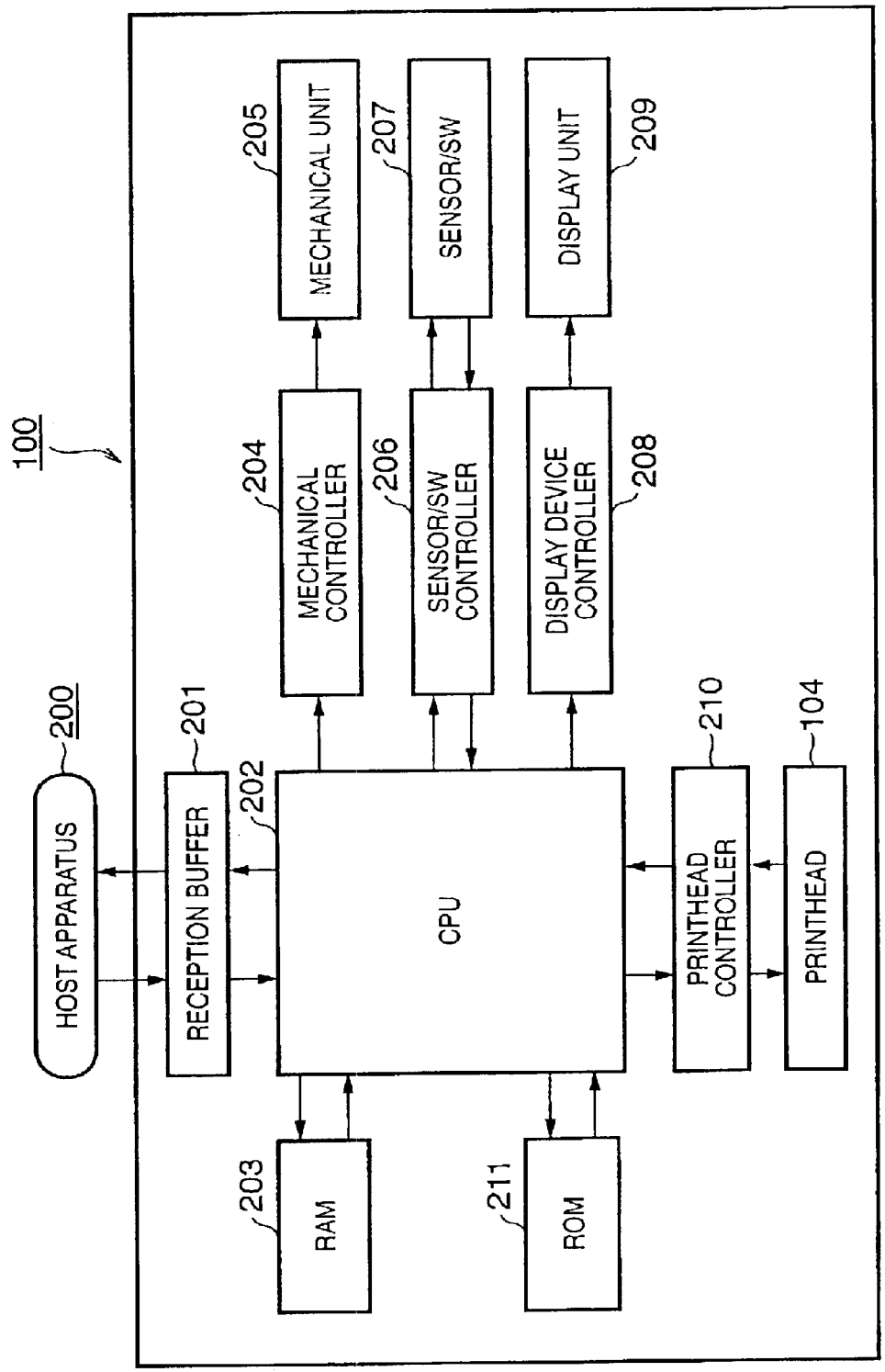
FIG. 2 is a block diagram showing the main control arrangement of the inkjet printing apparatus according to the first embodiment.

FIG. 2 is a block diagram showing the main control arrangement of the printing system according to the first embodiment. A host apparatus 200 is connected to the printing apparatus 100. Character data and image data to be printed are transmitted from the host apparatus 200 to the printing apparatus 100, and accumulated in a reception buffer 201. Data for verifying whether print data is correctly transferred, and data representing the operation status of the printing apparatus 100 are transmitted from the printing apparatus 100 to the host apparatus 200.

Data accumulated in the reception buffer 201 is processed into data for printing in main scanning of the printhead 104 under the management of a CPU 202 which operates in accordance with a control program stored in a ROM 211. The resultant data is stored in a print buffer within a random access memory (RAM) 203. The print buffer stores data used for printing by the printhead. Data stored in the print buffer is transferred to the printhead, and then printing is executed. In the example shown in FIG. 2, an area for the print buffer is ensured in the memory area of the RAM 203. Data in the print buffer is transferred to the printhead 104 by a printhead controller 210. The printhead is controlled to print character data or image data. The printhead controller 210 detects temperature information or the like representing the state of the printhead 104, and sends the information to the CPU 202. The information is transmitted to the printhead controller 210 which controls driving of the printhead.

A mechanical controller 204 drives and controls a mechanical unit 205 such as a carriage motor or line feed motor in response to an instruction from the CPU 202.

A sensor/SW controller 206 transmits a signal to the CPU 202 from a sensor/SW 207 including various sensors and SW (switch).

A display device controller 208 controls a display unit 209 comprised of LEDs, liquid crystal display devices, and the like for display panels in response to an instruction from the CPU 202.

Figure 3:
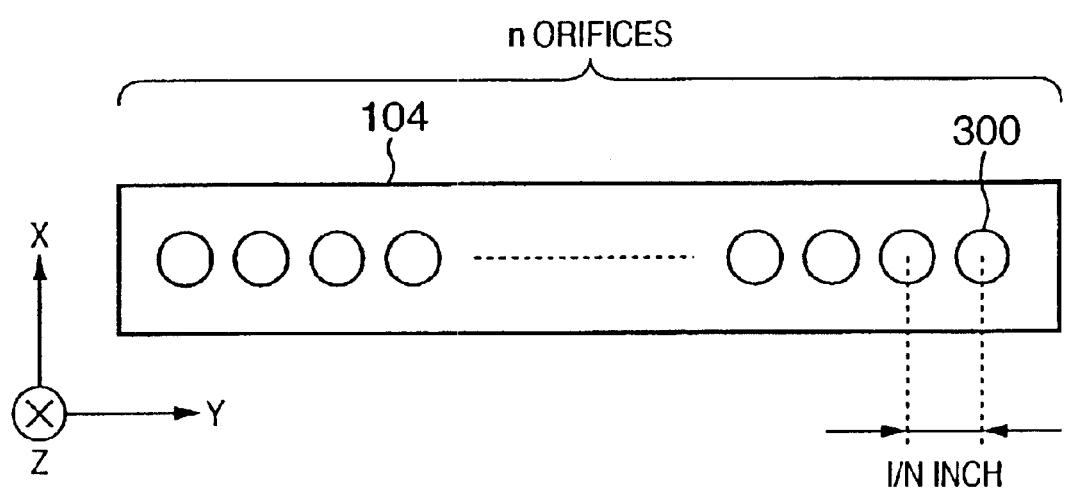
FIG. 3 is a view showing a printhead according to the first embodiment when viewed from the discharge surface.

FIG. 3 is a view showing a printhead according to this embodiment when viewed from the discharge surface. A printhead 104 shown in FIG. 3 is a black head which discharges black ink and has a density N=600 dots per inch (600 dpi) and n=300 (orifices) nozzles 300. The driving frequency of the printhead is 15 KHz, Printing operation can be performed at a density of 600 dpi in the main scanning direction. Hence, the main scanning speed of the carriage in printing operation is 25 inches/sec.

In this embodiment, to store binary data at a print density of 600 dpi×600 dpi, the print buffer section in a RAM 203 has a capacity corresponding to a region having a length of 300 dots, which is equal to the nozzle width (the number of orifices) of the printhead, and a width of 6 inches=3,600 dots, i.e., ¾ of one scanning width (8 inches=4,800 dots) of A4 paper. That is, the memory capacity ensured as the print buffer is 300×3,600=1,080,000 bits=1.08 Mbits.

In this embodiment, the capacity of the print buffer is set to be smaller than the data amount to be printed by one main scanning of the printhead for the main-scanning print width determined by the design of the apparatus, i.e., the maximum print width in the main scanning direction of the apparatus. That is, a capacity smaller than that necessary for storing print data of one main scanning corresponding to the maximum print width of the apparatus is ensured in a RAM 403. With this arrangement, the storage capacity of the RAM 403 arranged in the apparatus can be decreased. With the print buffer having the above arrangement, after the start of printing, data is circularly stored in the print buffer while sequentially re-using storage areas which become free as the printing is ended, thereby executing printing for every cycle of main scanning.

The printing method of this embodiment is 1-pass printing which completes printing by one main scanning using the black head having 300 nozzles. This is a one-way printing method of printing only in a direction indicated by an arrow Q2 in FIG. 1.

Printing operation will be described below with reference to FIG. 4 that shows a progress state of printing according to this embodiment.

A host apparatus 200 shown in FIG. 2 generates data to be printed by one main scanning and transfers the data to a printing apparatus 100. The printing apparatus 100 receives, from the host apparatus 200, data corresponding to the maximum memory capacity (set value) of the print buffer, i.e., length 300 dots×width 3,600 dots=1.08 Mbits and stores the data in the print buffer. Then, the printing apparatus 100 conveys a printing medium to the print start position, and executes main scanning from a position A to a position B in FIG. 4 in the direction indicated by the arrow Q2 to start printing in a region (i) After the start of printing, printing is performed while sequentially storing data sent from the host apparatus in the print buffer whose data has already been printed.

When printing by the first main scanning is ended, the carriage with the black head is returned from the position B to the position A in a direction indicated by an arrow Q1. The printing medium is conveyed (fed) in the sub-scanning direction by 300 dots. Then, printing by the second main scanning is started. In the second main scanning, data corresponding to the maximum memory capacity (set value), i.e., length 300 dots×width 3,600 dots=1.08 Mbits is received and stored in the print buffer, and then, printing is started, as in the first main scanning.

For the second main scanning, assume that data reception from the host apparatus is delayed during printing the width of 3,600 dots in a region (ii). In this case, when the region (ii) is printed in the direction of arrow Q2, data for a region (iii) is not stored in the print buffer yet. For this reason, printing/scanning is temporarily interrupted without printing the region (iii).

After that, the carriage is returned to the position A from which the second main scanning has started. When data (remaining data of the interrupted main scanning) corresponding to the width of the region (iii), i.e., length 300 dots×width 1,200 (=4,800−3,600) dots=0.36 Mbits is stored in the print buffer, main scanning that complements the second main scanning is started without feeding the paper sheet in the sub-scanning direction. When the carriage reaches the boundary portion between the region (ii) and the region (iii), discharge is started, and printing in the region (iii) is completed.

Next, the carriage with the black head is returned from the position B to the position A in the direction of arrow Q1. The printing medium is conveyed in the sub-scanning direction by 300 dots. Printing by the third main scanning is started. At this time, the data amount (set value) to be stored in the print buffer is set to a value different from the set value (1.08 Mbits) for the first main scanning and second main scanning before the start of printing. For example, in the third main scanning, data corresponding to a memory capacity (set value) for a width of 3,000 dots, i.e., length 300 dots×width 3,000 dots=0.9 Mbits is received and stored in the print buffer. Then, printing is started.

In the third main scanning, assume that data reception from the host apparatus is delayed during printing the width of 3,000 dots in a region (iv). In this case, when the region (iv) is printed in the direction of arrow Q2, data for a region (v) is not stored in the print buffer yet. For this reason, printing/scanning is temporarily interrupted without printing the region (v).

After that, the carriage is returned to the position A from which the third main scanning has started. When data (remaining data of the interrupted main scanning) corresponding to the width of the region (v), i.e., length 300 dots×width 1,800 (=4,800−3,000) dots=0.54 Mbits is stored in the print buffer, main scanning that complements the third main scanning is started without feeding the paper sheet in the sub-scanning direction. When the carriage reaches the boundary portion between the region (iv) and the region (v), discharge is started, and printing in the region (v) is completed.

Next, the carriage with the black head is returned from the position B to the position A in the direction of arrow Q1. The printing medium is conveyed in the sub-scanning direction by 300 dots. Printing by the fourth main scanning is started. At this time, the data amount (set value) to be stored in the print buffer is set to a value different from the set value (1.08 Mbits) for the first main scanning and second main scanning or the set value (0.9 Mbits) for the third main scanning before the start of printing. For example, in the fourth main scanning, data corresponding to a memory capacity (set value) for a width of 2,400 dots, i.e., length 300 dots×width 2,400 dots=0.72 Mbits is received and stored in the print buffer. Then, printing is started.

In the fourth main scanning, data reception from the host apparatus and storage of the data are smoothly performed during printing the data stored in the print buffer. Printing is performed in a region (vi) shown in FIG. 4 by one main scanning without any interruption in the direction of arrow Q2 from the position A to the position B.

In the fifth and subsequent main scanning operations (not shown), the set value serving as a trigger for the start of printing is returned to the maximum memory capacity as in the first main scanning. If printing cannot be completed by one main scanning, and main scanning is performed again for complement, the set value for the next main scanning is set to be smaller than that for the preceding main scanning. If printing by one main scanning is completed without any interruption, the set value for the next main scanning is returned to the maximum memory capacity in the initial state.

Figure 7:
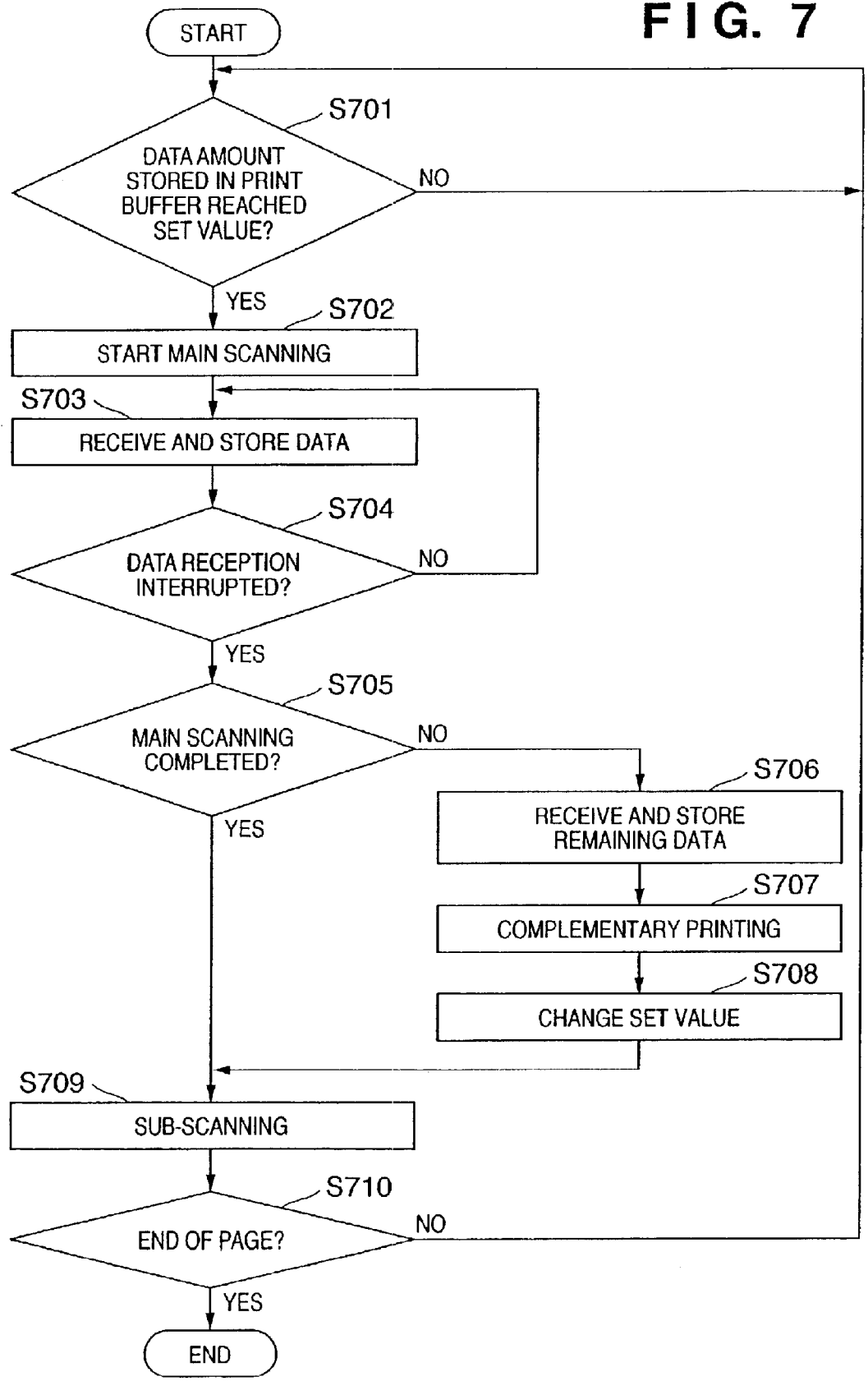
FIG. 7 is a flow chart showing printing operation for a printing medium of one page in the first embodiment.

The printing operation for a printing medium of one page in this embodiment will be described again with reference to the flow chart of FIG. 7.

When printing is instructed on an application activated in the host apparatus 200, the printer driver installed in the host apparatus 200 converts the data of the file or page designated for printing into data printable by the printing apparatus 100 and transmits the data to the printing apparatus using, as a unit, a data amount to be printed by the printing apparatus 100 by one main scanning.

Upon receiving the print instruction command from the host apparatus 200, the printing apparatus 100 stands by until the data received and stored in the print buffer reaches the set value (step S701). In this embodiment, the set value for the first main scanning equals the capacity (1.08 Mbits) of the print buffer, as described above.

When the data stored in the print buffer has reached the set value, main scanning is started to execute printing (step S702). Received data is circularly stored in the print buffer while sequentially re-using storage areas which become free as the printing is ended (step S703). This data reception/storage is continued until transmission data from the host apparatus stops, and data reception is interrupted.

When data reception is ended (step S704), it is determined whether main scanning is ended (step S705). This determination can be done on the basis of, e.g., information such as the carriage position.

If NO in step S705, it is recognized that data transfer from the host apparatus stops due to some reason, or the transfer rate decreases. Scanning is temporarily interrupted, the carriage is returned to the print start position, and processing stands by until the remaining data to be printed by the interrupted main scanning is stored in the print buffer (step S706). This data amount is obtained by subtracting the set value from the data amount to be printed by one main scanning, as described above.

When the remaining data is received and stored in the print buffer, complementary printing for printing a portion that is not printed by the interrupted main scanning is executed (step S707), and the set value is changed (step S708). In this change, more specifically, the set value is decreased. A predetermined value may be subtracted. Alternatively, a value corresponding to the time required for data reception in step S706 may be subtracted.

If it is determined in step S705 that main scanning is ended, or after processing in step S708, sub-scanning is executed to convey the printing medium by a distance corresponding to the number of use nozzles of the printhead (step S709). It is then determined whether printing of one page is ended (step S710).

If YES in step S710, the printing medium is discharged, and the processing is ended. If NO in step S710, the flow returns to step S710 to repeat the subsequent processing.

As described above, according to this embodiment, in the printing apparatus having a print buffer whose capacity is smaller than the data amount to be printed by one main scanning, even when data transfer from the host apparatus is delayed, and printing by one main scanning is interrupted halfway, complementary printing for the region where the data is not printed is performed to complete printing in the region corresponding to one main scanning.

Especially, in this embodiment, control is performed such that the position where printing by main scanning is to be interrupted due to a delay in data transmission from the host apparatus changes for every main scanning. More specifically, when an interruption occurs halfway during printing, the data amount (set value) to be stored in the print buffer is decremented by a predetermined amount until the next main scanning starts. With this operation, the position where printing is to be interrupted due to a delay in data transfer from the host apparatus comes close to print start position. Since vertical stripes that are formed at positions where printing was interrupted can be distributed in the scanning direction, any degradation in quality of the printed image can be prevented.

(Second Embodiment)

The second embodiment of the present invention will be described below. The inkjet printing apparatus of the second embodiment is the same as that of the first embodiment. A description of the same parts as in the first embodiment will be omitted below. The characteristic portions of the second embodiment will mainly be described.

Figure 4:
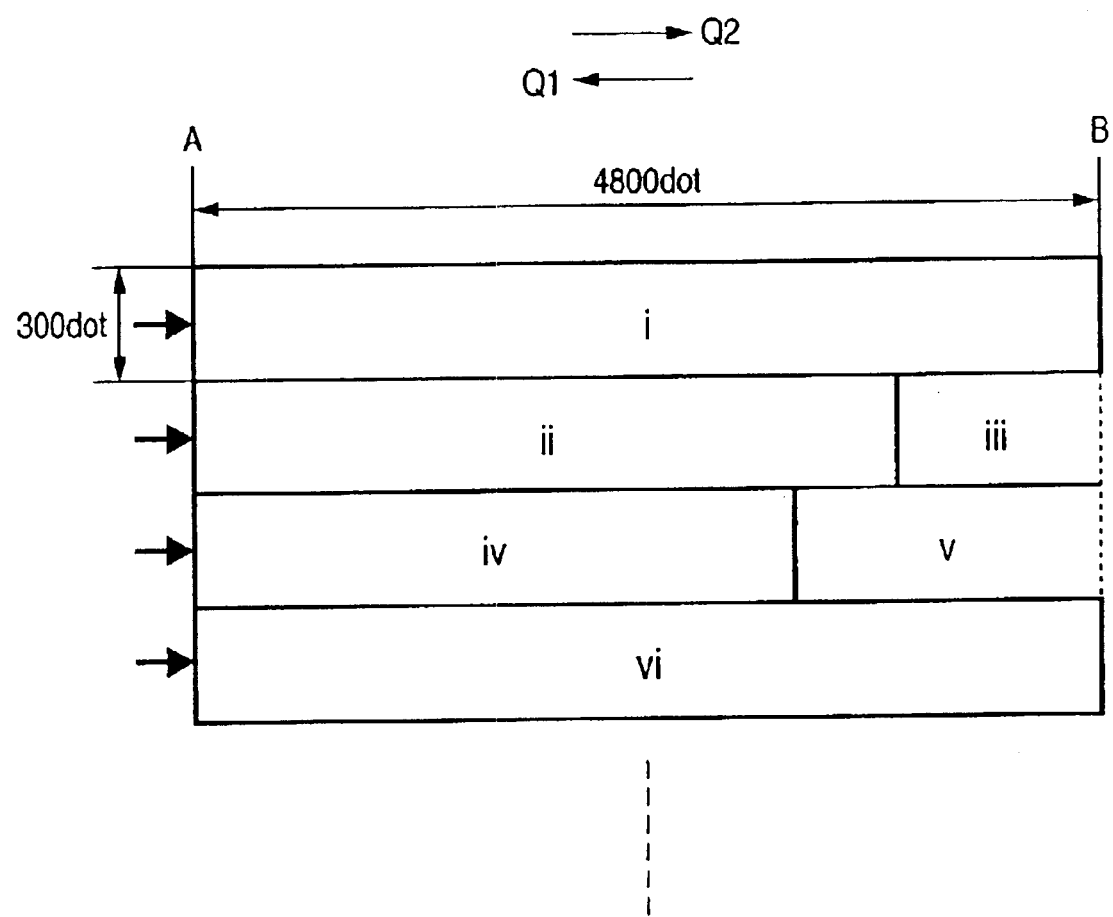
FIG. 4 is a view showing a progress state of printing according to the first embodiment.

In the first embodiment, one-way printing for printing only in the main scanning direction indicated by the arrow Q2 from the position A to the position B in FIG. 4 is performed. In the second embodiment, the printing direction is changed for every main scanning, i.e., two-way printing for alternately executing printing in a direction of arrow Q2 and that in a direction of arrow Q1 is performed.

Figure 5:
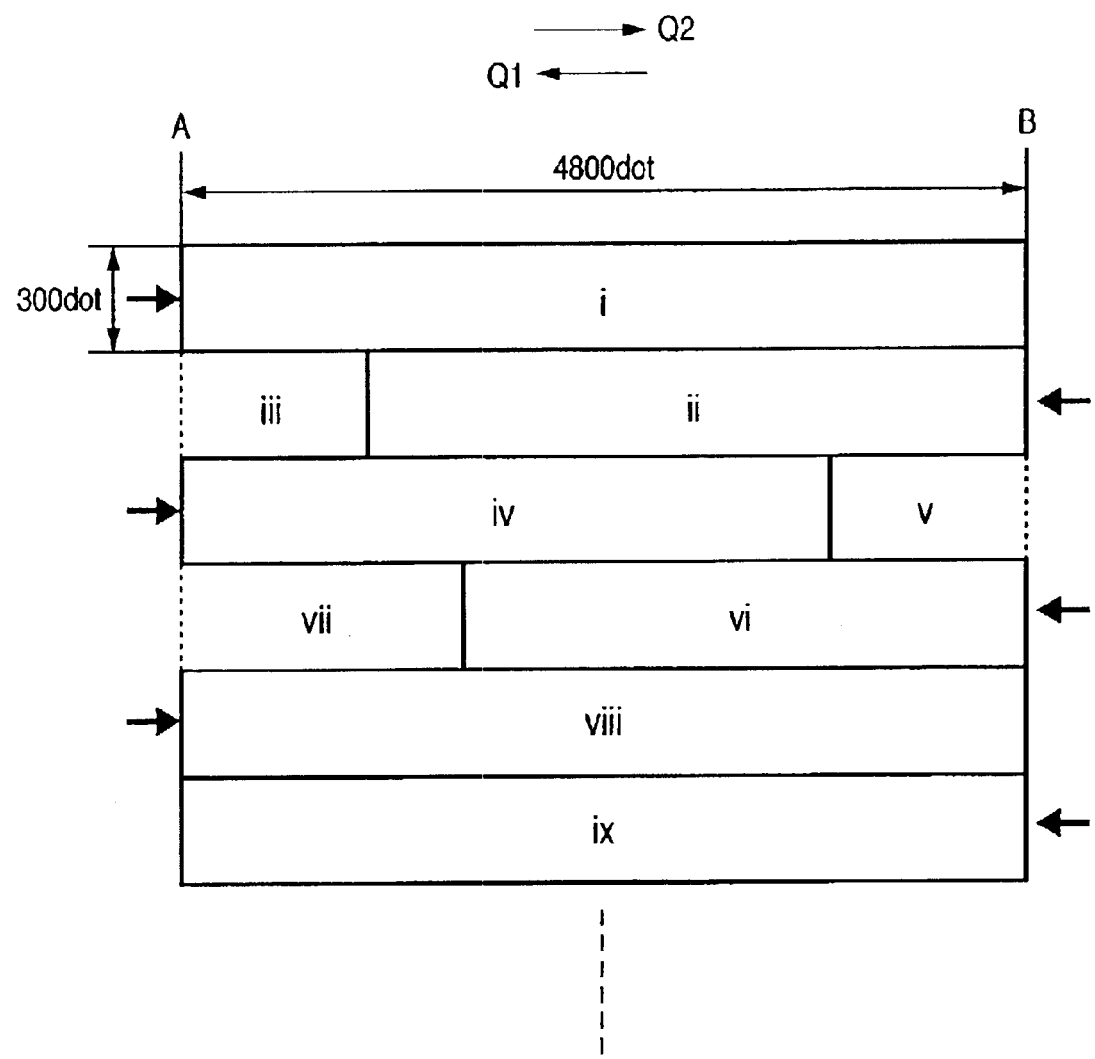
FIG. 5 is a view showing a progress state of printing according to the second embodiment.

Printing operation will be described below with reference to FIG. 5 that shows a progress state of printing according to this embodiment.

A host apparatus 200 shown in FIG. 2 generates data to be printed by one main scanning and transfers the data to a printing apparatus 100. The printing apparatus 100 receives, from the host apparatus 200, data corresponding to the maximum memory capacity (set value) of the print buffer, i.e., length 300 dots×width 3,600 dots=1.08 Mbits and stores the data in the print buffer. Then, the printing apparatus 100 conveys a printing medium to the print start position, and executes main scanning from a position A to a position B in FIG. 4 in the direction indicated by the arrow Q2 to start printing in a region (i) After the start of printing, printing is performed while sequentially storing data sent from the host apparatus in the print buffer whose data has already been printed.

When printing by the first main scanning is ended, the printing medium is conveyed (fed) in the sub-scanning direction by 300 dots. Then, printing by the second main scanning is started in the direction of arrow Q1.

In the second main scanning, data corresponding to the maximum memory capacity (set value), i.e., length 300 dots×width 3,600 dots=1.08 Mbits is received and stored in the print buffer, and then, printing is started, as in the first main scanning.

For the second main scanning, assume that data reception from the host apparatus is delayed during printing the width of 3,600 dots in a region (ii). In this case, when the region (ii) is printed in the direction of arrow Q1, data for a region (iii) is not stored in the print buffer yet. For this reason, printing/scanning is temporarily interrupted without printing the region (iii).

After that, the carriage is returned to the position A from which the second main scanning has started. When data (remaining data of the interrupted main scanning) corresponding to the width of the region (iii), i.e., length 300 dots×width 1,200 (=4,800−3,600) dots=0.36 Mbits is stored in the print buffer, main scanning that complements the second main scanning is started without feeding the paper sheet in the sub-scanning direction. When the carriage reaches the boundary portion between the region (ii) and the region (iii), discharge is started, and printing in the region (iii) is completed.

Next, the printing medium is conveyed in the sub-scanning direction by 300 dots. Printing by the third main scanning is started in the direction of arrow Q2.

In the second embodiment, in the third main scanning as well, data corresponding to the maximum memory capacity (set value), i.e., length 300 dots×width 3,600 dots=1.08 Mbits is received and stored in the print buffer, and then, printing is started, as in the first main scanning.

In the third main scanning, assume that data reception from the host apparatus is delayed during printing the width of 3,600 dots in a region (iv). In this case, when the region (iv) is printed in the direction of arrow Q2, data for a region (v) is not stored in the print buffer yet. For this reason, printing/scanning is temporarily interrupted without printing the region (v).

After that, the carriage is returned to the position A from which the third main scanning has started. When data (remaining data of the interrupted main scanning) corresponding to the width of the region (v), i.e., length 300 dots×width 1,200 (=4,800−3,600) dots=0.36 Mbits is stored in the print buffer, main scanning that complements the third main scanning is started without feeding the paper sheet in the sub-scanning direction. When the carriage reaches the boundary portion between the region (iv) and the region (v), discharge is started, and printing in the region (v) is completed.

Next, the printing medium is conveyed in the sub-scanning direction by 300 dots. Printing by the fourth main scanning is started in the direction of arrow Q1. At this time, the data amount (set value) to be stored in the print buffer is set to a value different from the set value (1.08 Mbits) used for the second main scanning before the start of printing. For example, in the fourth main scanning, data corresponding to a memory capacity (set value) for a width of 3,000 dots, i.e., length 300 dots×width 3,000 dots=0.9 Mbits is received and stored in the print buffer. Then, printing is started.

In the fourth main scanning, assume that data reception from the host apparatus is delayed during printing the width of 3,000. dots in a region (iv). In this case, when the region (vi) is printed in the direction of arrow Q1, data for a region (vii) is not stored in the print buffer yet. For this reason, printing/scanning is temporarily interrupted without printing the region (vii).

After that, the carriage is returned to the position B from which the fourth main scanning has started. When data (remaining data of the interrupted main scanning) corresponding to the width of the region (v), i.e., length 300 dots×width 1,800 (=4,800−3,000) dots=0.54 Mbits is stored in the print buffer, main scanning that complements the fourth main scanning is started without feeding the paper sheet in the sub-scanning direction. When the carriage reaches the boundary portion between the region (vi) and the region (vii), discharge is started, and printing in the region (vii) is completed.

Next, the printing medium is conveyed in the sub-scanning direction by 300 dots. Printing by the fifth main scanning is started. At this time, the data amount (set value) to be stored in the print buffer is set to a value different from the set value (1.08 Mbits) used for the first main scanning and third main scanning before the start of printing. For example, in the fifth main scanning, data corresponding to a memory capacity (set value) for a width of 3,000 dots, i.e., length 300 dots×width 3,000 dots=0.9 Mbits is received and stored in the print buffer. Then, printing is started.

In the fifth main scanning, data reception from the host apparatus and storage of the data are smoothly performed during printing the data stored in the print buffer. Printing is performed in a region (viii) shown in FIG. 5 by one main scanning without any interruption in the direction of arrow Q2 from the position A to the position B.

Next, the printing medium is conveyed in the sub-scanning direction by 300 dots. Printing by the sixth main scanning is started. At this time, the data amount (set value) to be stored in the print buffer is set to a value different from the set value used for the second main scanning or the set value used for the fourth main scanning before the start of printing. For example, in the sixth main scanning, data corresponding to a memory capacity (set value) for a width of 2,400 dots, i.e., length 300 dots×width 2,400 dots=0.72 Mbits is received and stored in the print buffer. Then, printing is started.

In the sixth main scanning, data reception from the host apparatus and storage of the data are smoothly performed during printing the data stored in the print buffer. Printing is performed in a region (ix) shown in FIG. 5 by one main scanning without any interruption in the direction of arrow Q2 from the position A to the position B.

In the seventh and subsequent main scanning operations (not shown), the set value serving as a trigger for the start of printing is returned to the maximum memory capacity as in the first main scanning and second main scanning. If printing cannot be completed by one main scanning, and main scanning is performed again for complement, the set value for the next main scanning in the same direction is set to be smaller than that for the preceding main scanning in the same direction. If printing by one main scanning is completed without any interruption, the set value for the next main scanning is returned to the maximum memory capacity in the initial state.

As described above, in this embodiment, the condition for the start of printing is independently controlled for main scanning in the forward direction, i.e., in the direction of arrow Q2 and main scanning in the reverse direction, i.e., the direction of arrow Q1.

The printing operation for a printing medium of one page in the second embodiment is almost the same as in the first embodiment except that the scanning direction changes for every main scanning. Two set values are prepared in correspondence with the scanning directions, and the set value corresponding to the scanning direction is changed in step S708 of the flow chart shown in FIG. 7.

As described above, according to this embodiment, in the printing apparatus which has a print buffer whose capacity is smaller than the data amount to be printed by one main scanning and performs two-way printing, even when data transfer from the host apparatus is delayed, and printing by one main scanning is interrupted halfway, complementary printing for the region where the data is not printed is performed to complete printing in the region corresponding to one main scanning.

Especially, in this embodiment, control is performed such that the position where printing by main scanning is to be interrupted due to a delay in data transmission from the host apparatus changes for every main scanning in each scanning direction. More specifically, when an interruption occurs halfway during printing in a certain scanning direction, the data amount (set value) to be stored in the print buffer is decremented by a predetermined amount until the next main scanning in the same direction starts. With this operation, the position where printing is to be interrupted due to a delay in data transfer from the host apparatus comes close to print start position. Since vertical stripes that are formed at positions where printing was interrupted can be distributed in each scanning direction, any degradation in quality of the printed image can be prevented.

(Third Embodiment)

The third embodiment of the present invention will be described below. The inkjet printing apparatus of the third embodiment is the same as that of the above embodiments. A description of the same parts as in the above embodiments will be omitted below. The characteristic portions of the third embodiment will mainly be described.

In the first and second embodiments, so-called 1-pass printing which completes printing in each printing region by one main scanning is performed. In the third embodiment, so-called multipass printing which executes a plurality of number of times of main scanning in each printing region is performed.

More specifically, main scanning in a direction indicated by an arrow Q2 is executed three times in each printing region. The printhead to be used is a black head having 300 nozzles arrayed at a pitch of 1/600 inch. In one sub-scanning, a printing medium is conveyed by a distance corresponding to 100 nozzles.

In this embodiment, to store binary data at a print density of 600 dpi×600 dpi, the print buffer section in a RAM 203 has a capacity capable of storing data corresponding to a region having a length of 300 dots, which is equal to the nozzle width of the printhead, and a width of 6 inches=3,600 dots, i.e., ¾ of one scanning width (8 inches=4,800 dots) of A4 paper. That is, the memory capacity ensured as the print buffer is 300×3,600=1,080,000 bits=1.08 Mbits.

Printing operation will be described below with reference to FIGS. 6A to 6F that show a progress state of printing according to this embodiment.

Figure 6A:
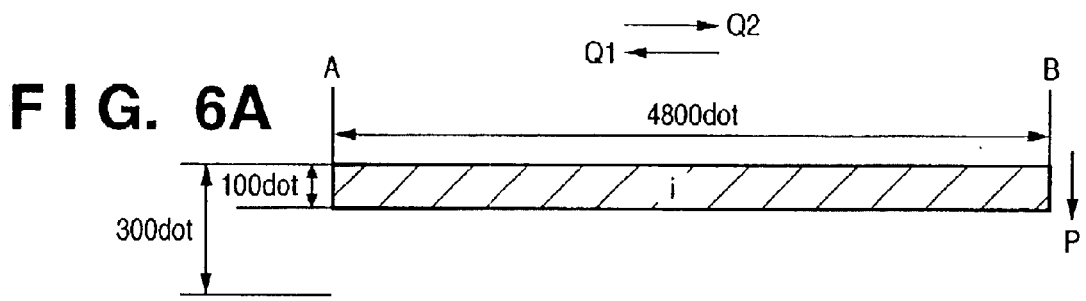
FIGS. 6A to 6F are views showing a progress state of printing according to the third embodiment.

A host apparatus 200 shown in FIG. 2 generates data to be printed by one main scanning and transfers the data to a printing apparatus 100. The printing apparatus 100 receives data corresponding to a region to be printed by one main scanning, i.e., a memory capacity (set value) of a length 100 dots×width 4,800 dots=0.48 Mbits and stores the data in the print buffer. Then, printing is performed in a region (i) by main scanning in the direction of arrow Q2 from a position A to a position B using ⅓ of the 300 nozzles, i.e., 100 nozzles, as shown in FIG. 6A.

When printing by the first main scanning is ended, the carriage with the black head is returned from the position B to the position A in a direction indicated by an arrow Q1. The printing medium is conveyed by 100 dots in the sub-scanning direction indicated by an arrow P.

Figure 6B:
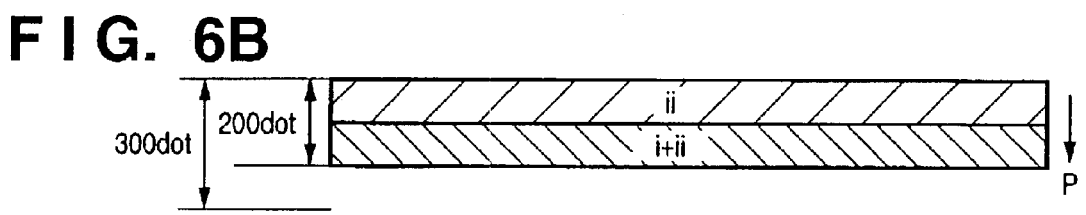

Next, data corresponding to a region to be printed by the second main scanning, i.e., a memory capacity (set value) of a length 200 dots×width 4,800 dots=0.96 Mbits is received and stored in the print buffer. Then, printing is performed in a region (ii) by main scanning in the direction of arrow Q2 from the position A to the position B using ⅔ of the 300 nozzles, i.e., 200 nozzles, as shown in FIG. 6B.

When printing by the second main scanning is ended, the carriage with the black head is returned from the position B to the position A in the direction of arrow Q1. The printing medium is conveyed by 100 dots in the sub-scanning direction of arrow P.

Figure 6C:
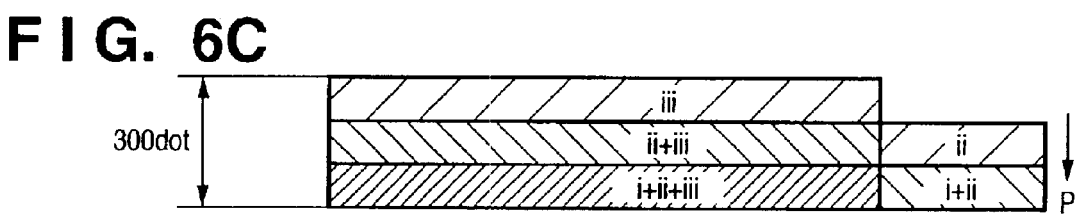

Next, data corresponding to a region to be printed by the third main scanning, i.e., the maximum memory capacity (set value) of a length 300 dots×width 3,600 dots=1.08 Mbits is received and stored in the print buffer. Then, printing is started in a region (iii) in the direction of arrow Q2 from the position A to the position B using all, the 300 nozzles, as shown in FIG. 6C.

In the third main scanning, assume that data sent from the host apparatus cannot be received during printing the width of 3,600 dots in a region (iii). In this case, when the region (iii) is printed in the direction of arrow Q2, data for a region (iii) and subsequent regions is not stored in the print buffer yet. For this reason, printing/scanning is temporarily interrupted without printing the region (iii) and subsequent regions.

Figure 6D:
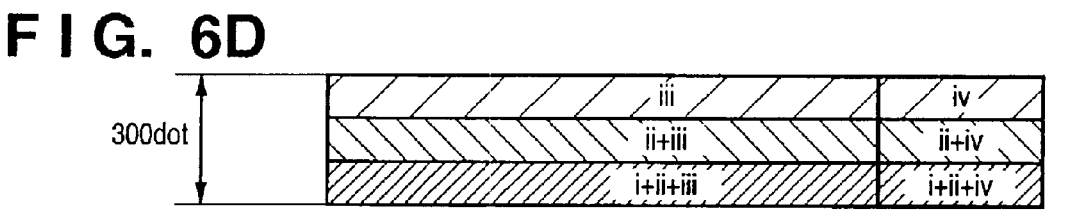

After that, the carriage is returned to the position A from which the third main scanning has started. When data (remaining data of the interrupted main scanning) corresponding to the width of the region (iii) and subsequent regions, i.e., length 300 dots×width 1,200 (=4,800–3,600) dots=0.36 Mbits is stored in the print buffer, main scanning that complements the third main scanning is started without feeding the paper sheet in the sub-scanning direction. When the carriage reaches the region (iv), discharge is started, and printing is performed up to the position B in the direction of arrow Q2, as shown in FIG. 6D.

Next, the carriage with the black head is returned from the position B to the position A in the direction of arrow Q1. The printing medium is conveyed in the sub-scanning direction of arrow P by 100 dots. Printing by the fourth main scanning is started. At this time, the data amount (set value) to be stored in the print buffer is set to a value different from the set value (1.08 Mbits) for the third main scanning before the start of printing. For example, in the fourth main scanning, data corresponding to a memory capacity (set value) for a width of 3,000 dots, i.e., length 300 dots×width 3,000 dots=0.9 Mbits is received and stored in the print buffer. Then, printing is started.

Figure 6E:
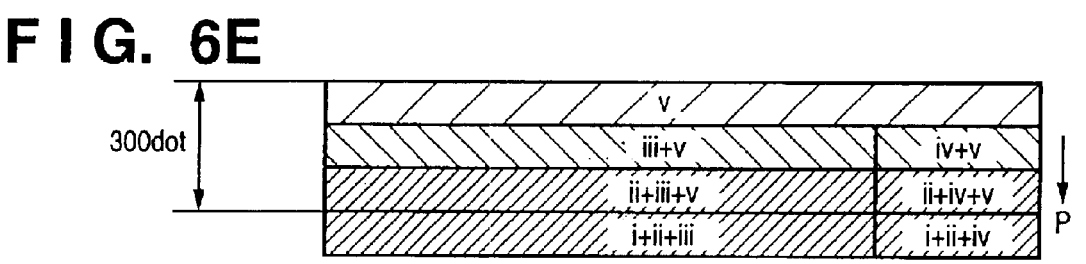

In the fourth main scanning, data reception from the host apparatus and storage of the data are smoothly performed during printing the data stored in the print buffer. Printing is performed in a region (v) by one main scanning without any interruption in the direction of arrow Q2 from the position A to the position B, as shown in FIG. 6E.

Next, the carriage with the black head is returned from the position B to the position A in the direction of arrow Q1. The printing medium is conveyed in the sub-scanning direction of arrow P by 100 dots. Printing by the fifth main scanning is started. The data amount (set value) to be stored in the print buffer is set to a value different from the set values for the third main scanning and fourth main scanning before the start of printing. For example, in the fifth main scanning, data corresponding to a memory capacity (set value) for a width of 2,400 dots, i.e., length 300 dots×width 2,400 dots=0.72 Mbits is received and stored in the print buffer. Then, printing is started.

Figure 6F:
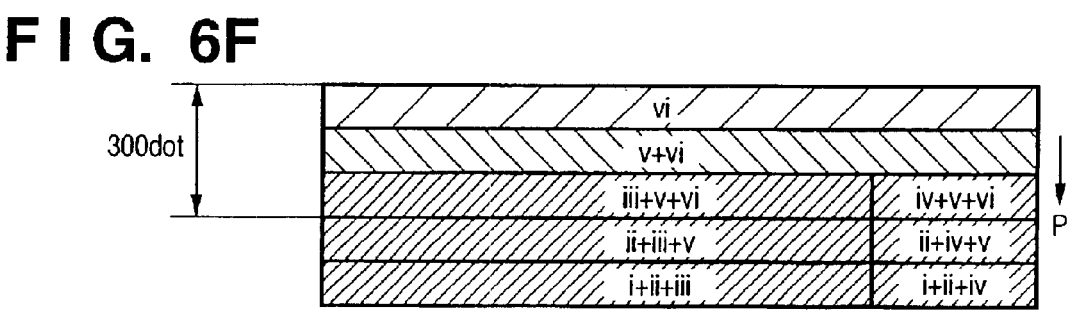

In the fifth main scanning, data reception from the host apparatus and storage of the data are smoothly performed during printing the data stored in the print buffer. Printing is performed in a region (vi) by one main scanning without any interruption in the direction of arrow Q2 from the position A to the position B, as shown in FIG. 6F.

In the sixth and subsequent main scanning operations (not shown), the set value serving as a trigger for the start of printing is set to the maximum memory capacity when all the 300 nozzles are used, as in the third main scanning. If printing cannot be completed by one main scanning, and main scanning is performed again for complement, the set values for main scanning operations of the subsequent multipass cycles (three times) are set to different values. If printing by one main scanning is completed without any interruption, the set value for the next main scanning is returned to the maximum memory capacity in the initial state.

The printing operation for a printing medium of one page in the third embodiment is almost the same as in the first embodiment except that the set values for the first main scanning and second main scanning and two main scanning operations before the end of printing are different. To set different set values for main scanning operations of the multipass cycles after an interruption of printing, a flag representing the interruption of printing is set, and the set values for the main scanning operations of the subsequent multipass cycles are changed in step S708 of the flow chart shown in FIG. 7.

As described above, according to this embodiment, in the printing apparatus which has a print buffer whose capacity is smaller than the data amount to be printed by one main scanning and performs multipass printing, even when data transfer from the host apparatus is delayed, and printing by one main scanning is interrupted halfway, complementary printing for the region where the data is not printed is performed to complete printing in the region corresponding to one main scanning.

Especially, in this embodiment, control is performed such that the position where printing by main scanning is to be interrupted due to a delay in data transmission from the host apparatus changes for every main scanning. More specifically, when an interruption occurs halfway during printing, the data amount (set value) to be stored in the print buffer is decremented by a predetermined amount until the next main scanning starts. With this operation, the position where printing is to be interrupted due to a delay in data transfer from the host apparatus comes close to print start position. Since vertical stripes that are formed at positions where printing was interrupted can be distributed in the scanning direction in multipass printing, any degradation in quality of the printed image can be prevented.

[Other Embodiment]

In the above embodiments, the capacity of the print buffer is set to ¾ the data amount to be printed by one main scanning. However, the capacity of the print buffer is not limited to this value.

When the capacity of the print buffer is larger than the data amount to be printed by one main scanning, the set value as the main-scanning print start condition may be set to be smaller than the data amount to be printed by one main scanning to shorten the time until the start of printing. Alternatively, the set value as the main-scanning print start condition may be set to be equal to or larger than the data amount to be printed by one main scanning to prevent any interruption of printing.

In this case, when a means for monitoring the data transfer rate from the host apparatus is provided, and the set value is changed in accordance with the data transfer rate, the interruption of printing can be more efficiently prevented.

In the example described the above embodiments, monochrome print data whose print resolution is 600 dpi×600 dpi and data amount per pixel is 1 bit is printed on an A4-size printing medium using a printhead having 300 nozzles at a density of 600 dpi. However, the size of printing medium, the print resolution, the data amount per pixel of print data, the number of colors of print data, and the number of nozzles of printhead are not limited to the above examples. In this case, the set value is changed in accordance with at least one of the size of printing medium, the print resolution, the data amount per pixel of print data, the number of colors of print data, and the number of nozzles of printhead.

In the above embodiments, the set value serving as a trigger for the start of printing in normal printing is set to the maximum memory capacity equal to the capacity of the print buffer. However, the initial value of the set value is not limited to this value and may be smaller than the capacity of the print buffer.

Main scanning for complement is started after print data of the remaining region is completely stored in the print buffer. In this case as well, main scanning may be started before print data of the remaining region is completely stored in the print buffer, as in normal main scanning. In this case, the set value may be the same as in normal main scanning or different.

In the third embodiment, if main scanning is interrupted, set values for main scanning operations of the subsequent multipass cycles are set to different values. However, some of the set values may have identical values.

In the above embodiments, if printing is interrupted, the carriage is returned to the print start position, and main scanning for complement is performed. However, the start position of main scanning for complement is not limited to the normal print start position and may be any position from which main scanning for complement can be executed.

More specifically, when printing is interrupted, the carriage is temporarily returned to the home position or pre-dischargeable position, and predischarge is executed before execution of complementary printing. With this operation, vertical stripes in the printed image due to an increase in viscosity of ink which occurs until complementary printing can be prevented.

In the above embodiments, a printing apparatus which performs monochrome printing using only a black head having 300 nozzles arrayed at a pitch of 1/600 inch has been described. However, the present invention can also be applied to a printing apparatus which performs color printing using inks of different colors such as cyan, magenta, and yellow and printheads corresponding to the respective colors.

In this case, a printhead having 100 nozzles arrayed at a pitch of 1/600 inch is arranged in correspondence with each of the three colors. When print data of each color is assigned to print data corresponding to a length of 100 nozzles, the same control as in the third embodiment can be applied, and the same effect as described above can be obtained.

The print buffer may be divided into a plurality of blocks and used for each block. The set value serving as a trigger for the start of printing maybe set for each block. The position where printing is to be interrupted may be made to correspond to the printing region of the block. In the above embodiments, printing is interrupted after data stored in the print buffer is printed. However, the present invention is not limited to this. The position where printing is to be interrupted may be controlled while monitoring one or both of the stored data amount and storable data amount.

If the present invention is realized as a storage medium, program codes corresponding to the above mentioned flowchart (FIG. 7) is to be stored in the storage medium.

As is apparent, many different embodiments of the present invention can be made without departing from the spirit and scope thereof, so it is to be understood that the invention is not limited to the specific embodiments thereof except as defined in the appended claims.

What is claimed is:

1. A printing apparatus for performing printing by scanning a printhead having an array of printing elements arranged in a predetermined direction over a printing medium in a direction crossing to the predetermined direction on the basis of information transmitted from a host apparatus, comprising:
    a buffer which stores print data transmitted from the host apparatus;
    start control means for starting printing by the scanning when the print data stored in said buffer reaches a first amount that is smaller than an amount of print data to be printed on the printing medium by the printhead by one scanning;
    scanning interrupt means for interrupting the scanning when storage of the print data in said buffer is delayed during the scanning; and
    complementary printing means for executing the interrupted scanning to complete printing by one scanning when, after the interruption, subsequent print data stored in said buffer reaches a second amount.

2. The apparatus according to claim 1, wherein said buffer has a capacity smaller than a print data amount to be printed by scanning the printhead once with respect to a maximum width that can be printed by scanning the printhead in the apparatus.

3. The apparatus according to claim 2, wherein the first amount equals the capacity of said print buffer.

4. The apparatus according to claim 2, wherein said print buffer stores newly transmitted print data by circularly re-using a portion where print data already used for printing is stored.

5. The apparatus according to claim 1, wherein a sum of the first amount and the second amount equals the amount of print data to be printed on the printing medium by the printhead by one scanning.

6. The apparatus according to claim 1, further comprising setting change means for, when the interrupt occurs, changing the first amount for next scanning.

7. The apparatus according to claim 6, wherein when the interrupt occurs, said setting change means decreases the first amount by a predetermined amount.

8. The apparatus according to claim 6, wherein when the interrupt occurs in consecutive scanning operations, said setting change means sets the first amount to different values for the respective scanning operations.

9. The apparatus according to claim 6, wherein when the interrupt does not occur, said setting change means returns the first amount to an initial value.

10. The apparatus according to claim 1, further comprising condition change means for changing the first amount in accordance with at least one of a size of printing medium, print resolution, data amount per pixel, type and number of print agents to be used for printing, and number of printing elements to be used for one scanning.

11. The apparatus according to claim 1, wherein multipass printing in which printing is completed by scanning each region a plurality of number of times is executed.

12. The apparatus according to claim 11, further comprising multi-setting change means for, when the interrupt occurs, setting the first amount to different values for the plurality of number of times of subsequent scanning.

13. The apparatus according to claim 1, wherein printing is performed by performing the scanning in two directions.

14. The apparatus according to claim 13, wherein said start control means sets the first amount independently for each scanning direction.

15. The apparatus according to claim 1, further comprising standby means for moving the printhead to a start position of the scanning after said scanning interrupt means interrupts the scanning.

16. The apparatus according to claim 15, wherein said standby means moves the printhead to the start position of the scanning.

17. The apparatus according to claim 15, wherein said standby means moves the printhead to a predischargeable position, and said complementary printing means execute predischarge before execution of the interrupted scanning.

18. The apparatus according to claim 1, wherein said buffer is divided into a plurality of blocks, and each of the first amount and the second amount is a multiple of a capacity of a block.

19. The apparatus according to claim 1, wherein the printhead is an inkjet printhead which performs printing by discharging ink.

20. The apparatus according to claim 19, wherein the printhead is a printhead which discharges ink using a thermal energy and has a thermal energy transducer which generates the thermal energy to be applied to the ink.

21. A printing method which causes a printhead having an array of printing elements arranged in a predetermined direction to scan over a printing medium in a direction crossing to the predetermined direction on the basis of information transmitted from a host apparatus, comprising:

a storage step of storing, in a buffer, print data transmitted from the host apparatus;

a start control step of starting printing by the scanning when the print data stored in the buffer reaches a first amount that is smaller than an amount of print data to be printed on the printing medium by the printhead by one scanning;

a scanning interrupt step of interrupting the scanning when storage of the print data in the buffer is delayed during the scanning; and a complementary printing step of executing the interrupted scanning to complete printing by one scanning when, after the interruption, subsequent print data stored in the buffer reaches a second amount.

22. A computer program comprising a program code for causing a computer to execute a printing method which causes a printhead having an array of printing elements arranged in a predetermined direction to scan over a printing medium in a direction crossing to the predetermined direction on the basis of information transmitted from a host apparatus, said method comprising:

a storage step of storing, in a buffer, print data transmitted from the host apparatus;

a start control step of starting printing by the scanning when the print data stored in the buffer reaches a first amount that is smaller than an amount of print data to be printed on the printing medium by the printhead by one scanning;

a scanning interrupt step of interrupting the scanning when storage of the print data in the buffer is delayed during the scanning; and a complementary printing step of executing the interrupted scanning to complete printing by one scanning when, after the interruption, subsequent print data stored in the buffer reaches a second amount.

23. A storage medium for storing a computer program comprising a program code for causing a computer to execute a printing method which causes a printhead having an array of printing elements arranged in a predetermined direction to scan over a printing medium in a direction crossing to the predetermined direction on the basis of information transmitted from a host apparatus, said method comprising:

a storage step of storing, in a buffer, print data transmitted from the host apparatus;

a start control step of starting printing by the scanning when the print data stored in the buffer reaches a first amount that is smaller than an amount of print data to be printed on the printing medium by the printhead by one scanning;

a scanning interrupt step of interrupting the scanning when storage of the print data in the buffer is delayed during the scanning; and a complementary printing step of executing the interrupted scanning to complete printing by one scanning when, after the interruption, subsequent print data stored in the buffer reaches a second amount.

24. A printing apparatus for performing printing by scanning a printhead having an array of printing elements arranged in a predetermined direction over a printing medium in a direction crossing to the predetermined direction on the basis of information transmitted from a host apparatus, comprising:

a buffer which stores print data transmitted from the host apparatus;

start control means for starting printing by the scanning when the print data stored in said buffer reaches a first amount that is smaller than an amount of print data to be printed on the printing medium by the printhead by one scanning;

scanning interrupt means for interrupting the scanning after the first amount of print data has been printed, when storageo of the print data in said buffer is delayed during the scanning; and complementary printing means for executing the interrupted scanning to complete printing by one scanning when, after the interruption, subsequent print data stored in said buffer reaches a second amount.

25. A printing method which causes a printhead having an array of printing elements arranged in a predetermined direction to scan over a printing medium in a direction crossing to the predetermined direction on the basis of information transmitted from a host apparatus, comprising:

a storage step of storing, in a buffer, print data transmitted from the host apparatus:

a start control step of starting printing by the scanning when the print data stored in said buffer reaches a first amount that is smaller than an amount of print data to be printed on the printing medium by the printhead by one scanning;

a scanning interrupt step of interrupting the scanning after the first amount of print data has been printed, when the storage of the print data in said buffer is delayed during the scanning; and a complementary printing step of executing the interrupted scanning to complete printing by one scanning when, after the interruption, subsequent print data stored in said buffer reaches a second amount.

* * * * *